May 17, 1932.  E. A. JOHNSTON  1,859,144
COTTON PICKER SPINDLE
Filed May 12, 1930

Inventor
Edward A. Johnston
By N. P. Doolittle
Atty.

Patented May 17, 1932

1,859,144

UNITED STATES PATENT OFFICE

EDWARD A. JOHNSTON, OF CHICAGO, ILLINOIS, ASSIGNOR TO INTERNATIONAL HARVESTER COMPANY, A CORPORATION OF NEW JERSEY

COTTON PICKER SPINDLE

Application filed May 12, 1930. Serial No. 451,570.

The invention herein disclosed relates to cotton picking spindles of the rotatable type adapted for use in conjunction with suitable transport and driving mechanism for picking cotton during travel in the field.

The main objects of the invention are to provide a spindle structure which will efficiently engage the cotton fiber, be easy to doff, and possess exceptional structural strength.

The objects are attained by providing a short or stub spindle body of novel tapering or cone-shaped form on which a stepped, band-like, spiral surface is formed having teeth which are so projected axially and circumferentially as to be aggressive in the direction of rotation of the spindle, but offer no resistance to stripping off of cotton fiber towards the apex of the spindle body, all as hereinafter more specifically described and illustrated on the accompanying drawings, where:

Figure 1:
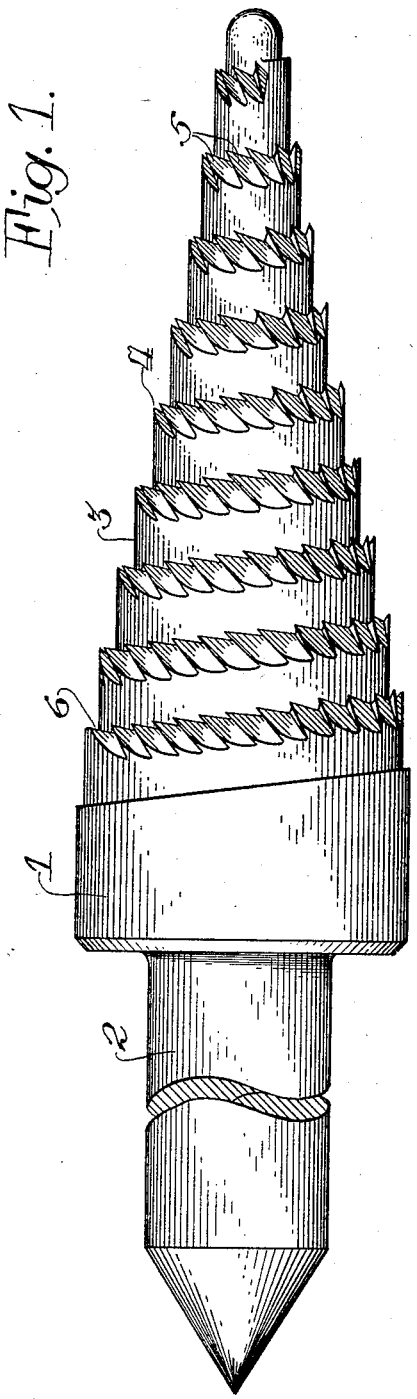
Figure 1 is an enlarged side view of a spindle embodying the invention.
Figure 3:
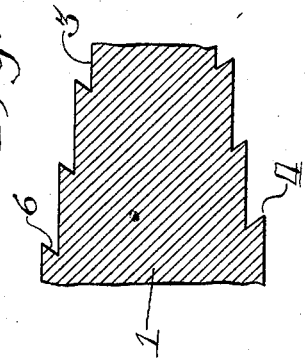
Figure 3 is a partial longitudinal section of the spindle body.
Figure 2:
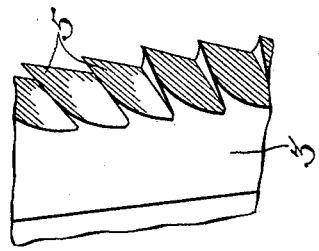
Figure 2 is a detail of the toothed portion.

In the preferred form illustrated, the spindle consists of a short, cone-shaped body portion 1 and a stem portion 2 of less diameter than the base of the body, and rigidly fixed centrally thereof.

The cone-shaped body of the spindle is cut away to provide a surface shaped as a diminishing, stepped spiral extending from the base to the apex of the body and presenting a band-like surface 3, which is of uniform width throughout its extent and has a plane surface which lies parallel to the longitudinal axis of the spindle.

The successive turns of the band-like, stepped surface are separated by a continuous, angular ledge or shoulder 4 facing axially and towards the apex of the spindle, and which is preferably undercut at 6. This shoulder is provided with picking teeth which may be formed by grinding out or notching the shoulder on lines oblique to the axis of the spindle to form angular teeth 5, which are thus formed to extend on surfaces level or even with the surface 3 below them so that the teeth are wholly within the diameter of the spindle below the shoulder, resulting in a cone-shaped spindle without any radially presented rough portions or projections such as would resist stripping of cotton in the direction of the apex of the spindle.

The spindle so constructed will aggressively engage and wind cotton fiber when rotated in contact therewith in the direction of the inclination of the teeth 5. Also, the fiber so collected can be easily removed from the spindle by doffing mechanism as the direction of projection of the teeth and the shape of the spindle body are both such as to present a smooth tapering surface to material moved longitudinally towards the end of the spindle and, therefore, offer no resistance to movement of the collected fiber towards the apex of the spindle, as in doffing, due to the fact that all of the teeth extend axially within surfaces which are parallel to the longitudinal axis of the spindle and gradually approach that axis as they near the apex.

The preferred form of the invention herein disclosed is obviously capable of modification without departure from the gist of the invention as defined in the following claims.

What is claimed is:

1. A cotton picking spindle comprising a cone-shaped body having a spiral shoulder facing towards the apex of the body and extending from base to apex thereof, said shoulder being provided with teeth the outer surfaces of which are parallel to the axis of the spindle.

2. A cotton picking spindle comprising a cone-shaped body having a stepped spiral surface formation with the angular shoulder between successive turns of the spiral provided with teeth extending obliquely to the axis of the spindle and lying within the diameter of the spiral surface.

3. A cotton picking spindle comprising a cone-shaped body the surface of which is formed to provide a diminishing stepped spiral the successive turns of which are concentric to the longitudinal axis of the spindle and are separated by angular shoulders, and teeth on said angular shoulders and lying within the diameter of the spiral turns.

4. A cotton picking spindle comprising a cone-shaped body the surface of which is formed to provide a diminishing stepped spiral the successive turns of which lie parallel to the longitudinal axis of the spindle, an angular shoulder formed at the junction of the stepped surfaces, and angular teeth on the shoulder substantially throughout the length thereof and extending obliquely to the axis of the spindle and level with the surface of the spiral.

5. A cotton picking spindle having a cone-shaped body and a stem of less diameter than the base of the body projecting centrally thereof, the surface of the body being of stepped spiral form with the spiral extending from substantially the base to the apex of the body, and obliquely extending teeth formed on the step or shoulder separating the successive turns of the spiral and confined within the width of said shoulder.

6. A cotton picking spindle comprising a body formed with successive circumferential smooth surfaces diminishing in diameter from base to apex of the spindle and separated by an angular shoulder, and picking teeth extending axially from the shoulder and having one side extending on a level with the surface under the shoulder.

7. A cotton picking spindle having a tapering body and picking teeth extending axially from the surface thereof and towards the apex of the spindle.

In testimony whereof I affix my signature.

EDWARD A. JOHNSTON.